Dec. 25, 1934.   H. VOGLER   1,985,752
APPARATUS FOR MACHINING PROPELLER BLADES
Filed March 16, 1933   4 Sheets-Sheet 1

Inventor
Hermann Vogler
by
W. E. Evans
Attorney.

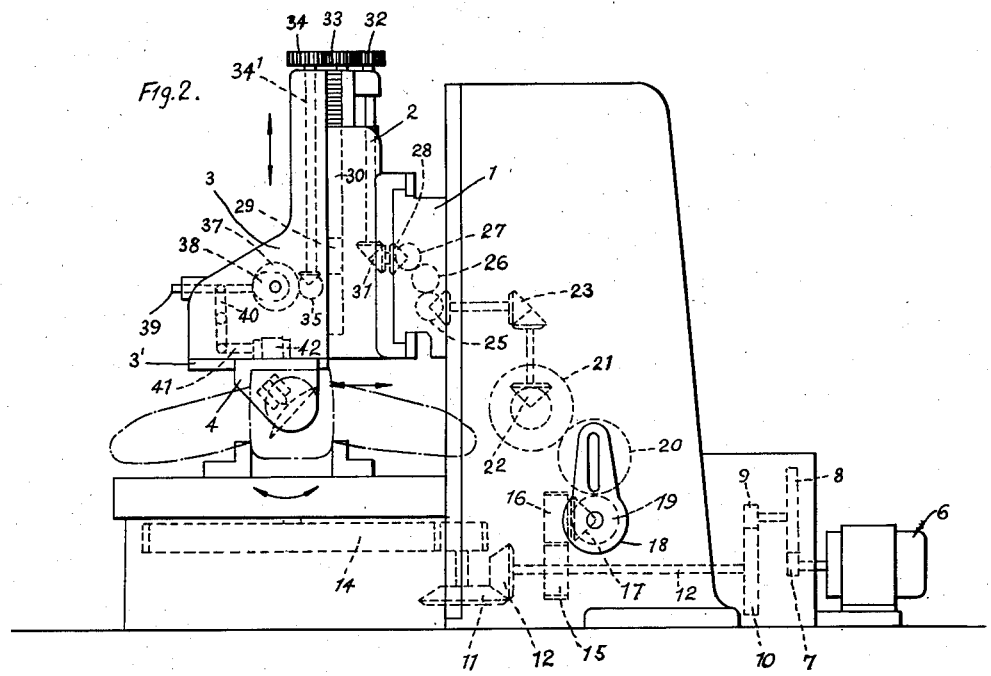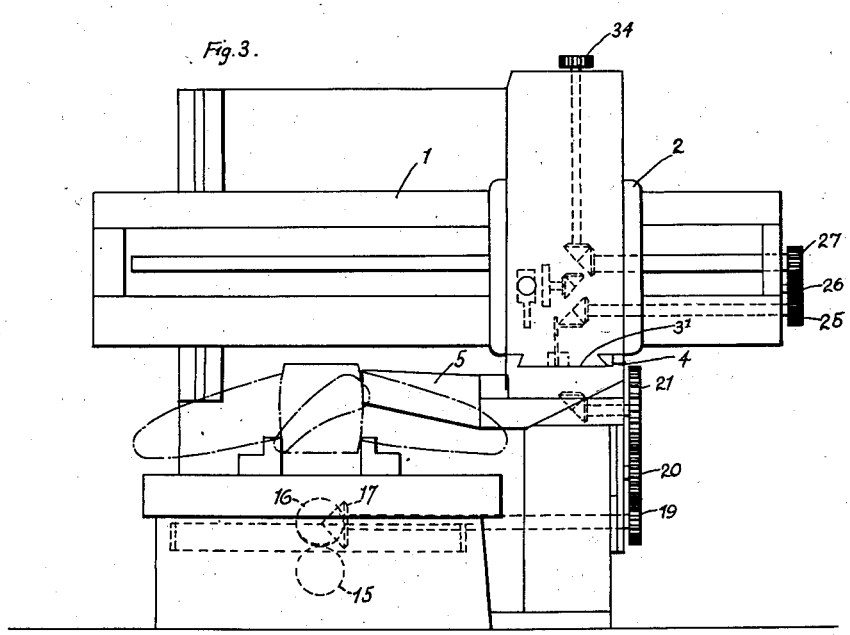

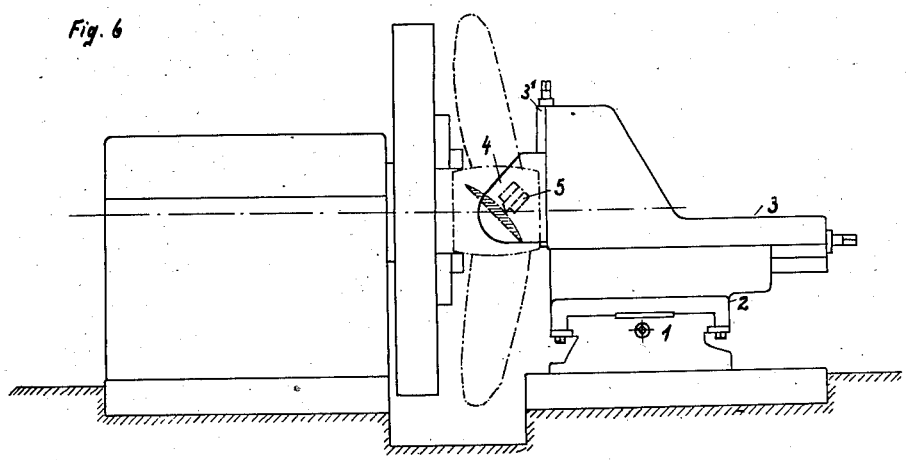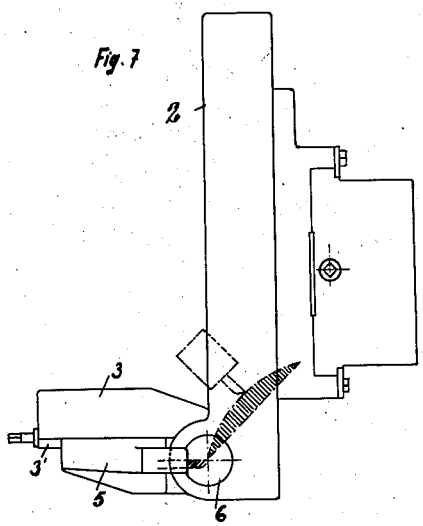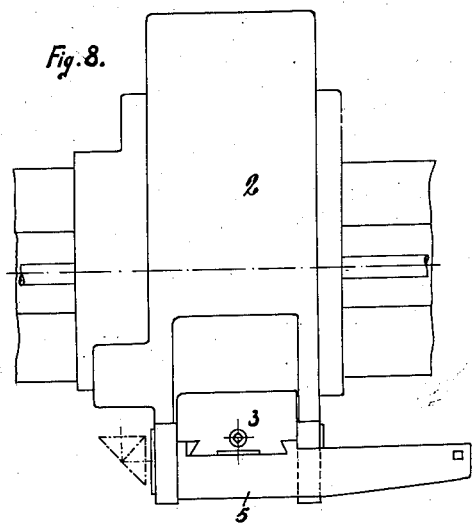

Patented Dec. 25, 1934

1,985,752

UNITED STATES PATENT OFFICE 1,985,752

APPARATUS FOR MACHINING PROPELLER BLADES

Hermann Vogler, Dusseldorf, Germany, assignor to Schiess-Defries Aktiengesellschaft, Dusseldorf, Germany Application March 16, 1933, Serial No. 661,053 In Germany March 15, 1932

5 Claims. (Cl. 82—11)

Whereas for a long time past the front side of ships' propellers, that is the side by which pressure or a thrust is exerted, alone has been machined, only recently has it been shown to be necessary to machine the propellers on the rear—that is the suction—side. Generally the pressure faces are mathematical screw surfaces. On the other hand the rear surfaces show limits of curvature which vary from a screw surface. It has been proposed, when machining the suction side of propeller blades, to give to the cutting tool an additional movement parallel or perpendicular to the propeller axis or perpendicular to the centre pitch line. Such machines are, however, special machines capable of carrying out only this one operation. According to the invention vertical or horizontal lathes may be adapted, by the use of suitable additional mechanism or by the application of additional devices, to be used for producing an additional movement of the tool in a direction perpendicular to the propeller axis.

In addition to the movements necessarily involved in machining mathematical screw surfaces, that is to say the oscillatory movement of the work during the reciprocation of the tool and the swinging movement of the tool holder or of the tool after each operative movement for arriving at the cutting angle, there are two further movements, one being a reciprocatory movement of the tool effected by means of a controlled sliding member on a guide track in the support of the vertical or horizontal lathe, constituting an additional movement of the tool for the machining of the propeller suction faces, and the second being a swinging movement of the tool while the curved rear face of the propeller is being traversed in order to secure the correct cutting angle.

The accompanying drawings illustrate diagrammatically examples of apparatus constructed according to the invention.

Figures 2 and 3 are front and side elevations of a one-pedestal vertical lathe with means for turning propellers.

Figure 6 shows a horizontal lathe provided with means for turning propellers.

Figures 7 and 8 illustrate two views of a support for a vertical lathe with guide track for the tool carrier capable of a rocking movement.

Figure 1:
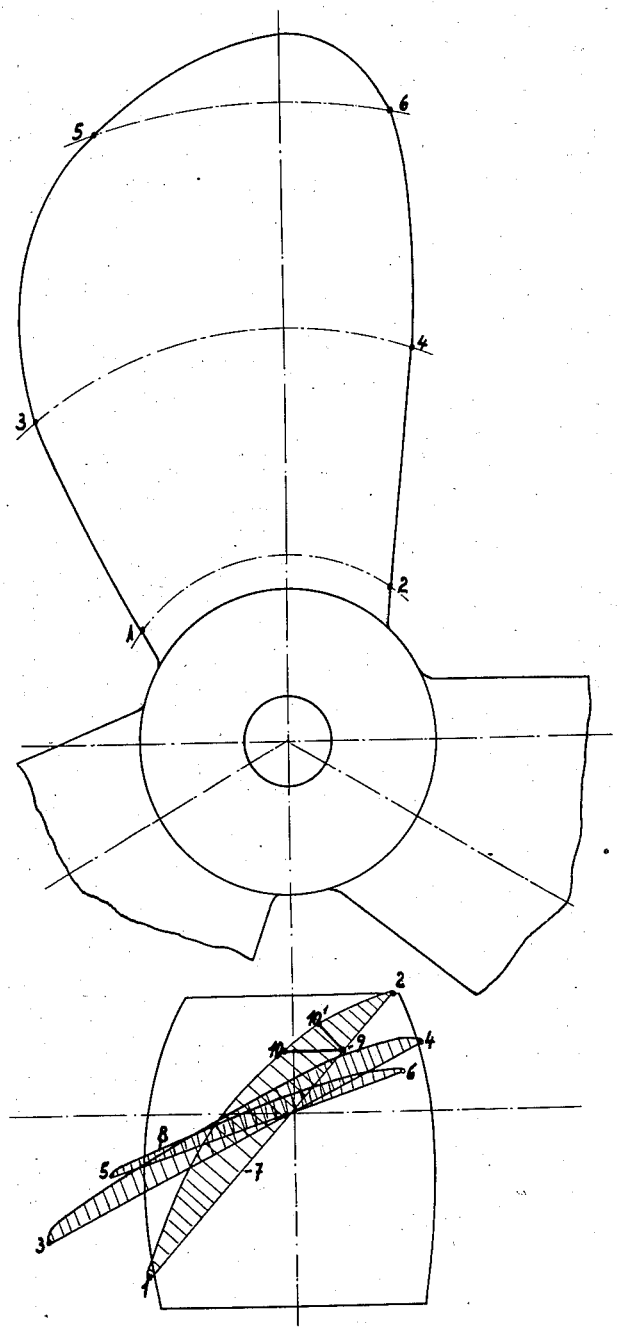
Figure 1 illustrates a number of curved sections through a propeller blade having a curved rear face.

Referring to the drawings, the curved sections 1, 2, 3—4, 5—6, according to Figure 1 show the suction side 8 of a propeller blade defined by a curve which differs from the mathematical screw surfaces of the pressure side 7 of the propeller. In order to move from a point 9 of a generatrix of the mathematical screw surface to a point 10 on the suction surface, it is necessary to move the tool which is passing along the generatrix the distance from 9 to 10, in the present case at right-angles to the axis of the propeller. As will be seen by reference to a further construction, this additional movement may alternatively be made in direction of the radius of the curvature of the rear surface, that is to say in the direction from 9 to 10'.

According to Figures 2 and 3 a support 2 is provided instead of the ordinary support of a one-pedestal vertical lathe on the cross rail 1, the vertical slide 3 on the support 2 making the reciprocating movement b in the turning of mathematical screw surfaces. The vertical slide 3 is provided on its under side with a horizontal guide 3', along which the tool slide 4 that carries the rocking tool holder 5 moves.

The apparatus operates as follows:

The reversing motor 6 imparts to the work table an oscillatory movement of rotation by means of the wheels 7, 8, 9, 10, 11, 12, 13, 14. At the same time the change speed wheels provided on a change gear quadrant 18 are driven by the driving shaft 12' through the wheels 15, 16 and bevel wheel 17. The change speed wheels are to be selected according to the pitch of the propeller screw surface. From the last change speed wheel the movement is carried on through bevel wheels 22, 23, 24 on to spur wheels 25, 26, 27, bevel wheel 28 and thus to a rack pinion 29 which engages in the vertical rack 30 and produces a reciprocating movement of the vertical slide 3. At the same time the change shaft leading to the rack drive, drives the vertical spindle 34' in the vertical slide 3 by means of bevel wheels 31 and spur wheels 32, 33, 34 and transmits rotary movement to a cam drum 38 by means of bevel wheels 35 and spur wheels 36, 37. As a result of this rotation, the rod 39 is moved laterally and the rod 41 is moved by a two-armed lever 40. The rod 41 moves the tool slide 4 on the guide 3' by means of a cam 42, and in such manner that the tool during its movement on the curved rear surfaces is always positioned at the correct cutting angle to the rear surfaces.

Figure 4:
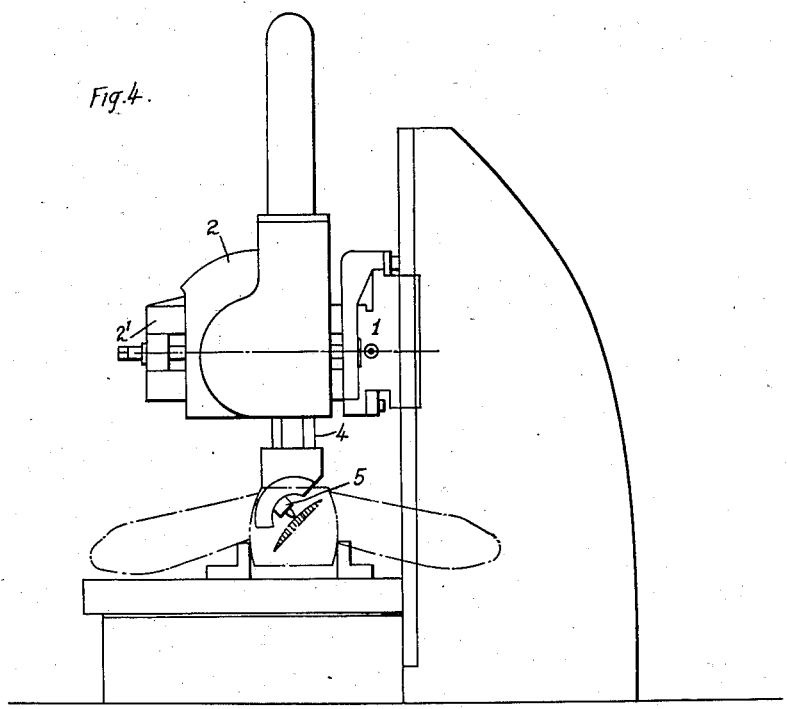
Figures 4 and 5 are front and side elevations of a large two-pedestal vertical lathe also provided with means for turning propellers.
Figure 5:
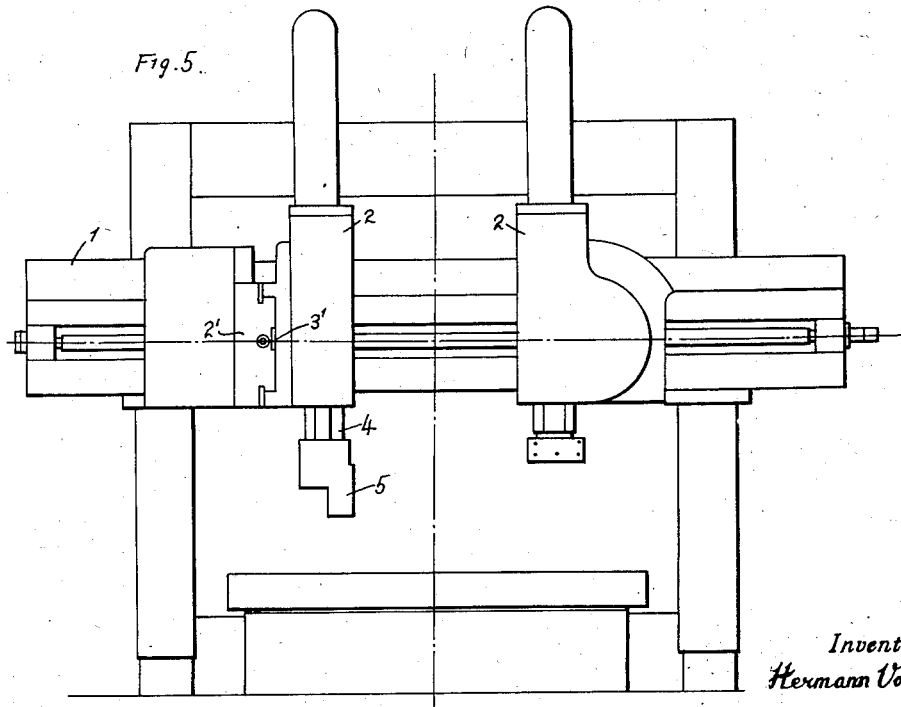

In the large two-pedestal vertical lathe shown in Figures 4 and 5 one of the two tool supports 2 is mounted upon a bracket member 2', which is movably secured upon the cross rail 1 of the machine and is provided with a horizontal guide way 3'. The support 2 slides along the guideway 3' and in doing so gives the tool the additional movement at right-angles to the axis of the propeller. The rocking movement of the tool for exact adjustment to the cutting position is obtained by a tool holder 5 which is rotatably mounted in the vertical tool slide 4 of the support 2.

According to Figure 6 a support 2 is provided on the transverse bed 1 of a horizontal lathe and carries the tool slide 3 by which the reciprocating movement of the tool is effected. The tool slide 3 is provided, as in the case of the one-pedestal vertical lathe according to Figures 2 and 3, with a guide track 3' which in this case is perpendicular, and on which the tool slide 4 reciprocates and is therefore able to impart the additional movement to the tool, and furthermore with a rocking tool holder 5 for setting the tool to the exact cutting position while passing over the rear surface of the propeller blade.

In some cases it will be an advantage not to effect the additional movement perpendicular to the propeller axis, that is to say, from 9 to 10 in Figure 1, which is assumed in the examples hereinbefore described, and to effect the additional movement in the direction 9 to 10' according to Figure 1, that is to say, in the direction of the radius of the rear surface, particularly when the suction surface is very sharply curved at its ends.

In this case a support as shown in Figures 7 and 8 could be employed; the vertical support 2 has a pivot 6 around which the slide 3 can rock. This slide 3 is provided with the guideway 3' for the tool holder 5 on which track, the tool holder makes its additional movement in the direction 9 to 10' according to Figure 1, as the guideway is rocked around the pivotal point 6 and always sets itself in the direction of the radius of curvature, the tool at the same time assuming a correct cutting position.

The movements of the tool hereinbefore mentioned, the additional movement at right-angles to the propeller axis or in the direction of the radius of curvature of the rear surface, as also the rocking movement of the tool holder, may be produced for example by a guide roller the shape of which accords with the changing cross sections of the blade. The connection between the guide roller and the tool or its method of fixing is effected preferably by means of a hydraulic servomotor control of known construction, for maintaining the roller free from the pressure of the tool.

I claim:

1. Apparatus for machining propeller blades by means of a turning tool, comprising a work support mounted for rotational movement, a frame member and a compound tool support carried by said frame member, said tool support consisting of a plurality of relatively movable parts one of which comprises a tool carrier in which is mounted the turning tool, and means for imparting to said work support and to the parts of said tool support co-ordinated movements, the movements of the parts of the compound tool support being effected in a direction parallel with and also at an angle to the axis of the work support whereby the turning tool is caused to produce upon a blade of a propeller mounted upon the work support a surface departing from a helical surface as determined by the extent of movement of the tool in the direction at an angle to the axis of the work support.

2. Apparatus for machining propeller blades by means of a turning tool, comprising a work support mounted for rotational movement alternately in opposed directions, a frame member and a compound tool support carried by said frame member, said tool support consisting of a plurality of relatively movable parts one of which comprises a tool carrier in which is mounted the turning tool, and means for imparting to said work support and to the parts of said tool support coordinated movements, the movements of the parts of the compound tool support being effected in a direction parallel with and also at an angle to the axis of the work support whereby the turning tool is caused to produce upon a blade of a propeller mounted upon the work support a surface departing from a helical surface as determined by the extent of the movement of the tool in the direction at an angle to the axis of the work support.

3. Apparatus for machining propeller blades by means of a turning tool, comprising a work support mounted for rotational movement, a frame member, a tool support mounted upon said frame member for reciprocatory movement in a direction parallel to the axis of the work support, a tool slide mounted upon said tool support for movement in a direction at an angle to that of the tool support, a turning tool supported on said tool slide, and means for imparting to the said work support, the said tool support and the said tool slide, co-ordinated movements to cause the tool to produce upon a blade of a propeller mounted upon the work support a surface which departs from a helical surface as determined by the extent of the movement of the tool slide.

4. Apparatus for machining propeller blades by means of a turning tool, comprising a work support mounted for rotational movement, a frame member, a tool support mounted upon said frame member for reciprocatory movement in a direction parallel to the axis of the work support, a tool slide mounted upon said tool support for movement in a direction at an angle to that of the tool support, a tool carrier mounted upon said tool slide, a turning tool fitted in said carrier, and means for imparting to the said work support, the said tool support and the said tool slide, co-ordinated movements to cause the tool to produce upon a blade of a propeller mounted upon the work support a surface which departs from a helical surface as determined by the extent of movement of the tool slide, the tool carrier being rotatably mounted upon the tool slide so as to be rotatably adjustable about an axis transverse to the direction of movement of the tool slide.

5. Apparatus for machining propeller blades by means of a turning tool, comprising a work support mounted for rotational movement, a frame member, a tool support mounted on said frame member for reciprocatory movement in a direction parallel to the axis of the work support, a tool slide rotatably mounted about an axis transverse to the direction of movement of the tool support and also for movement towards and away from the said axis, a tool carrier mounted on said tool slide, a turning tool fitted in said carrier, and means for imparting to said work support, said tool support and said tool slide, co-ordinated movements to cause the tool to produce upon a blade of a propeller mounted upon the work support a surface which departs from a helical surface as determined by the extent of the movement of the tool slide towards its axis of rotation.

HERMANN VOGLER.